(12) United States Patent
Yanagawa et al.

(10) Patent No.: US 9,205,773 B2
(45) Date of Patent: Dec. 8, 2015

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Watara Yanagawa, Aichi-ken (JP); Kazuhiro Yamada, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 204 days.

(21) Appl. No.: 13/957,498

(22) Filed: Aug. 2, 2013

(65) Prior Publication Data

US 2014/0041166 A1 Feb. 13, 2014

(30) Foreign Application Priority Data

Aug. 9, 2012 (JP) .................................. 2012-177393

(51) Int. Cl.
*B60R 22/36* (2006.01)
*B60P 7/08* (2006.01)

(52) U.S. Cl.
CPC .............. *B60P 7/083* (2013.01); *Y10T 24/2117* (2015.01)

(58) Field of Classification Search
CPC .............................. B60R 22/36; B60R 22/415

USPC ...................... 242/382.1–382.2, 383.2, 383.5
See application file for complete search history.

(56) References Cited

U.S. PATENT DOCUMENTS 5,938,138 A * 8/1999 Sumiyashiki ............... 242/382.2
2001/0038054 A1 * 11/2001 Mori et al. ................... 242/382.2

FOREIGN PATENT DOCUMENTS

JP 10-244905 A 9/1998

* cited by examiner

*Primary Examiner* — Sang Kim
(74) *Attorney, Agent, or Firm* — Roberts Mlotkowski Safran & Cole P.C.

(57) ABSTRACT

An extension rib extends from a pressing portion in the take-up direction of an ALR cam and is formed to be able to abut with an ALR pawl. Accordingly, when the ALR cam excessively rotates in the pull-out direction with respect to a set position in a maximal pulled-out state, the ALR pawl abuts the extension rib. Accordingly, it is possible to suppress a state in which the ALR pawl climbs over the pressing portion and engages with a V-gear. Namely, even if a rotation variation of the ALR cam becomes large by setting a speed reduction ratio of speed reduction mechanism to a small value, it is possible to absorb such variation by the extension rib. Thus, it is possible to absorb rotation variation of the ALR cam while improving accuracy of switching timing from the ELR (or ALR) state to the ALR (or ELR) state.

7 Claims, 7 Drawing Sheets

WEBBING TAKE-UP DEVICE

CROSS-REFERENCE TO RELATED APPLICATION

This application claims priority under 35 USC 119 from Japanese Patent Application No. 2012-177393 filed Aug. 9, 2012, the disclosure of which is incorporated by reference herein.

BACKGROUND OF THE INVENTION

1. Field of the Invention

The present invention relates to a webbing take-up device having a lock mechanism which prohibits a rotation of a spool in the pull-out direction.

2. Related Art

Among webbing take-up devices, there is known a webbing take-up device in which a so-called ELR (Emergency Locking Retractor) and a so-called ALR (Automatic Locking Retractor) are provided (for example, see Japanese Patent Application Laid-Open (JP-A) No. 10-244905).

In the webbing take-up device disclosed in Japanese Patent Application Laid-Open (JP-A) No. 10-244905, switching is performed between the ALR and the ELR by an ALR mechanism, and the ALR mechanism includes a cam member (a switching cam) that is connected to a take-up shaft (a spool) via a speed reduction mechanism and a disk control (a control disk). When a webbing is pulled out in the pull-out direction from a state where the webbing is fully wound on the take up shaft, an ALR pawl is held by an inhibition portion of the disk control, so the ALR pawl does not engage with the lock mechanism. Accordingly, the webbing take-up device becomes the ELR state.

Meanwhile, when the webbing is fully pulled out from the take up shaft, the ALR pawl is disposed onto an interlocking inhibition portion (a pressing portion) of the cam member. Then, when the webbing rotates in the take-up direction from this state, the ALR pawl rotates to the lock position, so the ALR pawl engages with the lock mechanism. Accordingly, the lock mechanism is operated so that the webbing take-up device is switched to the ALR state.

However, in this webbing take-up device, the cam member is connected to the take up shaft via the speed reduction mechanism as described above. Accordingly, in a case in which the speed reduction ratio of the speed reduction mechanism is set to a large value, the rotation amount of the cam member with respect to the rotation of the take up shaft decreases, so that the switching timing from the ELR (or ALR) state to the ALR (or ELR) state becomes unclear.

Therefore, in a case in which the speed reduction ratio of the speed reduction mechanism is set to a small value, the rotation amount of the cam member with respect to the rotation of the take up shaft increases, so the accuracy for the switching timing from the ELR (or ALR) state to the ALR (or ELR) state may be improved.

However, in this case, since a rotation variation of the cam member increases due to an assembly variation or a variation of components such as the speed reduction mechanism and the cam member, there is a possibility that the ALR pawl climbs over the interlocking inhibition portion of the cam member when the webbing is fully pulled out from the take up shaft. Thus, it is desirable to obtain a structure capable of absorbing a rotation variation of the cam member while improving the accuracy for the switching timing from the ELR (or ALR) state to the ALR (or ELR) state.

SUMMARY OF THE INVENTION

The present invention has been made in view of the above-described circumstance, and the present invention is to provide a webbing take-up device capable of absorbing a rotation variation of a switching cam while improving an accuracy for a switching timing from an ELR (or ALR) state to an ALR (or ELR) state.

According to a first aspect of the present invention, there is provided a webbing take-up device including: a spool that rotates in a take-up direction so as to take up a webbing thereon and rotates in a pull-out direction by the webbing being pulled out therefrom; a lock mechanism that stops rotation of the spool in the pull-out direction by the lock mechanism being operated; an ALR pawl that is movable between a lock position where the ALR pawl and the lock mechanism are engaged so that the lock mechanism is operated, and a release position where engagement of the ALR pawl and the lock mechanism is released; a switching cam that is connected to the spool via a speed reduction mechanism which reduces rotation of the spool, and rotates interlockingly with rotation of the spool; a control disk that is provided so as to be coaxial with the switching cam and that includes a holding portion, the holding portion being pressed by the switching cam so as to rotate interlockingly with the switching cam, and the holding portion abutting with the ALR pawl so as to hold the ALR pawl at the release position between from a maximal taken-up state where the webbing is maximally taken up on the spool to a state which is near a maximal pulled out state where the webbing is maximally pulled out from the spool; a pressing portion that is integrally formed with the switching cam, the pressing portion pressing the holding portion so as to rotate the control disk when the switching cam is rotated in the pull-out direction, the pressing portion abutting with the ALR pawl in the maximal pulled out state so as to hold the ALR pawl at the release position, and the pressing portion permitting movement of the ALR pawl to the lock position by the switching cam being rotated in the take-up direction from the maximal pulled out state such that the pressing portion is separated away from the holding portion by a predetermined distance; and an extension portion that extends from the pressing portion in the take-up direction of the switching cam and that is configured to be able to abut with the ALR pawl.

In the webbing take-up device according to the first aspect of the present invention, the ALR pawl is movable between the lock position and the release position. By the ALR pawl being moved to the lock position, the ALR pawl engages with the lock mechanism so the lock mechanism is operated. Accordingly, the rotation of the spool in the pull-out direction is stopped (inhibited), so that the webbing take-up device becomes a so-called ALR (Automatic Locking Retractor) state.

Meanwhile, by the ALR pawl being moved to the release position, the engagement between the ALR pawl and the lock mechanism is released, so the rotation of the spool in the pull-out direction is permitted. Accordingly, for example, by the lock mechanism being operated by an acceleration sensor when a vehicle is abruptly decelerated, the webbing take-up device becomes a so-called ELR (Emergency Locking Retractor) state.

Further, the switching cam is connected to the spool via the speed reduction mechanism, and the switching cam rotates interlockingly with the rotation of the spool. In addition, the control disk is provided so as to be coaxial with the switching cam, and it is configured that when the switching cam rotates, the pressing portion of the switching cam presses (pushes) the holding portion of the control disk.

When the webbing is pulled out from the maximal taken up state us to the state which is near (just before) the maximal pulled out state, the holding portion of the control disk is pressed (pushed) by the pressing portion of the switching cam, so the control disk is rotated interlockingly with the switching cam. At this time, the ALR pawl abuts with the holding portion of the control disk, so the ALR pawl is held at the release position. Accordingly, since the lock mechanism is not operated by the ALR pawl, the webbing take-up device is made to be in the ELR state.

In addition, when the webbing is further pulled out to the maximal pulled out state, the switching cam and the control disk are rotated, so the ALR pawl abuts with the pressing portion. That is, the ALR pawl is transferred from the holding portion to the pressing portion. Then, by the switching cam being rotated in the take-up direction from the maximal pulled out state and the pressing unit being separated away from the holding portion with the predetermined distance, the movement of the ALR pawl to the lock position is permitted. Accordingly, when the spool is rotated in the take-up direction from the maximal pulled out state, the ALR pawl is arranged between the pressing portion and the holding portion, so the lock mechanism is operated by the ALR pawl. Thus, the webbing take-up device is switched from the ELR state to the ALR state.

Here, the extension portion extends from the pressing portion in the take-up direction of the switching cam, and is able to abut with the ALR pawl. Accordingly, in a case in which the switching cam excessively rotates in the pull-out direction with respect to a set position at the maximal pulled out state, the ALR pawl abuts with the extension portion. As the result, it is possible to suppress a state where the ALR pawl climbs over the pressing portion so as to engage with the lock mechanism. For this reason, even if a rotation variation of the switching cam becomes large by setting the speed reduction ratio of the speed reduction mechanism to a small value, it is possible to absorb such rotation variation by the extension portion. Thus, it is possible to absorb the rotation variation of the switching cam while improving the accuracy for the switching timing from the ELR (or ALR) state to the ALR (or ELR) state.

According to a second aspect of the present invention, there is provided the webbing take-up device according to the first aspect of the present invention, wherein the lock mechanism includes a gear, the gear being disposed so as to be coaxial with the switching cam and the gear including lock teeth formed on an outer peripheral portion of the gear so as to be able to engage with the ALR pawl; the ALR pawl is configured to be rotatable at an outer side in a radial direction of the gear; and the extension portion is disposed at an outer side in a radial direction of the switching cam with respect to the holding portion.

In the webbing take-up device according to the second aspect of the present invention, the lock mechanism includes the gear. The gear is disposed so as to be coaxial with the switching cam, and the outer peripheral portion of the gear is formed with the lock teeth. Further, the ALR pawl is rotatable at the outer side in the radial direction of the gear, and by the ALR pawl being engaged with the lock teeth of the gear, the lock mechanism is operated.

Here, the extension portion is disposed at the outer side in the radial direction of the switching cam with respect to the holding portion. Accordingly, even in a case in which the ALR pawl abuts with the extension portion in the maximal pulled out state, the ALR pawl moves to the outer side in the radial direction of the gear, and hence the escape amount of the ALR pawl with respect to the gear can be increased.

Further, when the switching cam is rotated in the take-up direction and the pressing portion presses the holding portion, the interference between the extension portion and the holding portion can be suppressed.

According to a third aspect of the present invention, there is provided the webbing take-up device according to the second aspect of the present invention, wherein a sloped portion is formed at the pressing portion at an outer side portion in the radial direction of the switching cam, the sloped portion being sloped toward the outer side in the radial direction of the switching cam on progress in the take-up direction of the switching cam.

In the webbing take-up device according to the third aspect of the present invention, the sloped portion is formed at the outer side portion of the pressing portion in the radial direction of the switching cam. The sloped portion is arranged so as to be inclined toward the outer side in the radial direction of the switching cam as it goes toward the take-up direction of the switching cam. Accordingly, even in a case in which the ALR pawl abuts with the extension portion in the maximal pulled out state, the ALR pawl can smoothly slide-contact from the sloped portion to the extension portion.

According to a fourth aspect of the present invention, there is provided the webbing take-up device according to any one of the first to third aspects of the present invention, wherein the ALR pawl includes an abut portion that is configured to be able to abut with the pressing portion and the holding portion; and a positioning portion, at which the abut portion is arranged in the maximal pulled out state, is formed at the extension portion.

In the webbing take-up device according to the fourth aspect of the present invention, the ALR pawl includes the abut portion, and the abut portion is configured to be able to abut with the pressing portion and the holding portion. Here, at the extension portion, the positioning portion at which the abut portion is arranged in the maximal pulled out state. Accordingly, since it is possible to assemble the pawl with arranging the abut portion at the positioning portion in the maximal pulled out state, it is possible to suppress occurrence of the extra length of the webbing in the maximal pulled out state.

In the above aspects, it is possible that the extension portion extends in the take-up direction of the switching cam from an outside portion, in a radial direction of the switching cam, of the pressing portion, and a surface of the outside portion of the pressing portion is connected to an outer side surface, in the radial direction, of the extension portion.

According to the webbing take-up device of the first aspect of the present invention, it is possible to absorb the rotation variation of the switching cam while improving the accuracy for the switching timing from the ELR (or ALR) state to the ALR (or ELR) state.

According to the webbing take-up device of the second aspect of the present invention, it is possible to increase the escape amount of the ALR pawl with respect to the gear. Thus, it is possible to suppress the interference between the extension portion and the holding portion when the switching cam is rotated in the take-up direction so the pressing portion presses the holding portion.

According to the webbing take-up device of the third aspect of the present invention, it is possible to cause the ALR pawl to smoothly slide-contact from the sloped portion to the extension portion.

According to the webbing take-up device of the fourth aspect of the present invention, it is possible to suppress the occurrence of the extra length of the webbing in the maximal pulled out state.

BRIEF DESCRIPTION OF THE DRAWINGS

Embodiments of the invention will be described in detail with reference to the following figures, wherein.

DETAILED DESCRIPTION OF THE INVENTION

Figure 2:
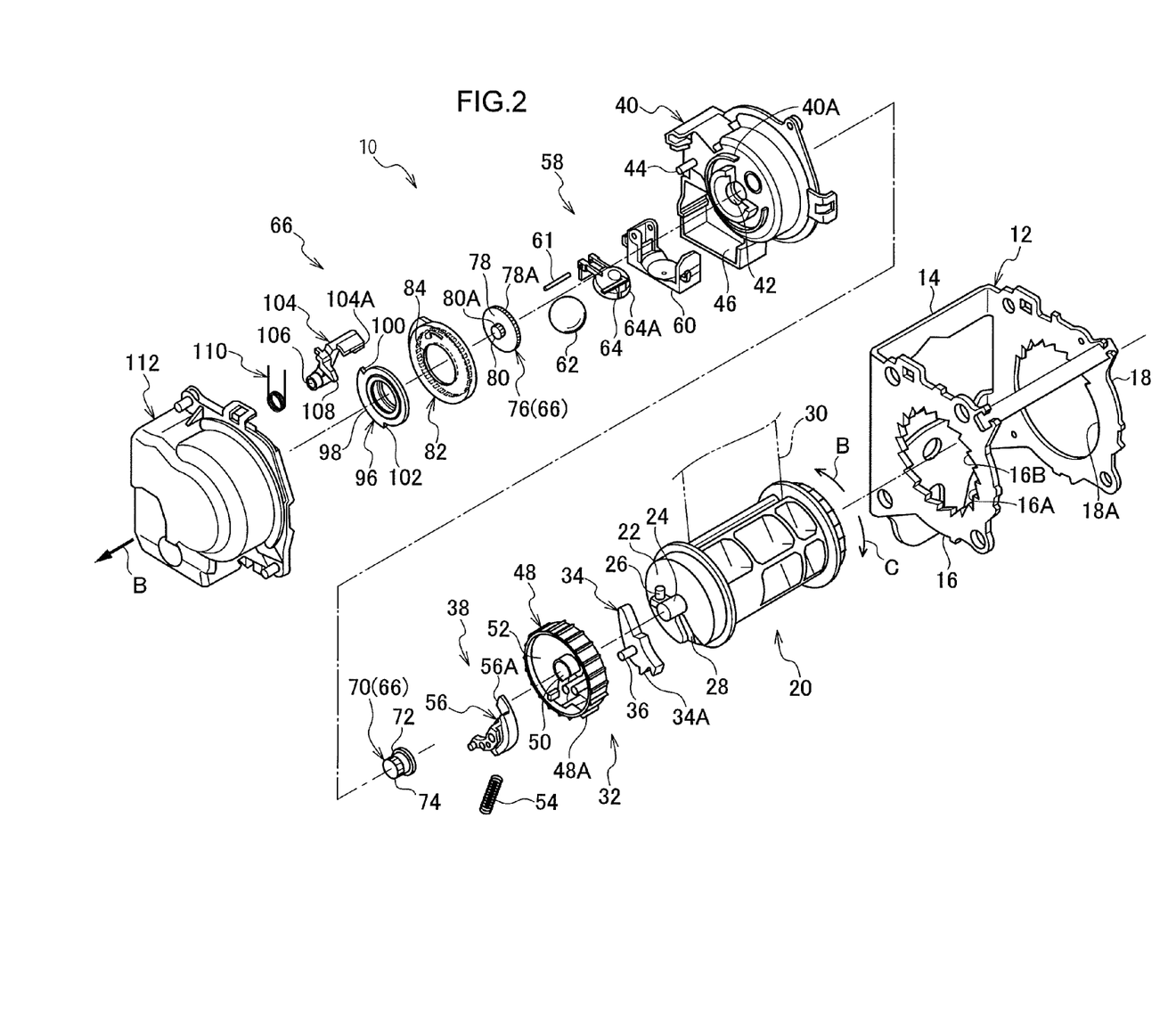
FIG. 2 is an exploded perspective view illustrating the webbing take-up device according to the embodiment.

Hereinafter, an exemplary embodiment of the present invention will be described by referring to the drawings. As illustrated in FIG. 2, a webbing take-up device 10 according to the embodiment of the present invention includes a frame 12, a substantially circular cylinder (columnar) spool 20 which is disposed inside the frame 12, a webbing 30 which extends from the spool 20, a lock mechanism 32 which is disposed at one side in the axial direction (at the side indicated by the arrow A direction of FIG. 2) of the spool 20, and an ALR mechanism 66. Hereinafter, the respective configurations will be described.

The frame 12 includes a plate-like back plate 14 which is fixed to a vehicle body. Respective leg plates 16 and 18 perpendicularly extend from both ends of the back plate 14 in the width direction, and the frame 12 is substantially formed in a concave shape in a plan view. Respective circular arrangement holes 16A and 18A are formed in the leg plate 16 and the leg plate 18 so as to penetrate the leg plates 16 and 18 respectively, and at the entire inner periphery of the arrangement hole 16A, ratchet teeth 16B (inner teeth) are formed.

The spool 20 is disposed between the leg plate 16 and the leg plate 18 by a direction in which the leg plate 16 and the leg plate 18 face each other being as the axial direction. A substantially disk-like lock base 22 is integrally provided at an end of the spool 20 at the leg plate 16 side. A substantially circular cylinder (columnar) rotation shaft 24 is integrally formed with the lock base 22, and the rotation shaft 24 protrudes from the lock base 22 toward the leg plate 16 side. Further, the lock base 22 is provided with a convex catching portion 26 which is for catching a return spring 54 of a sensor mechanism 38 to be described later. In addition, at the lock base 22, a movement groove 28 which is for accommodating a lock plate 34 of the lock mechanism 32 to be described later is formed, and the movement groove 28 is opened to the outside in the radial direction of the lock base 22.

The webbing 30 is formed in a long belt shape, and one end (a base end) of the webbing 30 in the length direction is connected and fixed to the spool 20. By the spool 20 being rotated in the take-up direction (the direction indicated by the arrow B of FIG. 2), the webbing 30 is wound (taken up) on the outer peripheral portion of the spool 20 in a layer state from its base end side. Meanwhile, the other end (a leading end) of the webbing 30 in the length direction is fixed to an anchor (not shown in the drawings) of a vehicle, and by the other end side of the webbing 30 in the length direction is pulled, the spool 20 rotates in the pull-out direction (the direction indicated by the arrow C of FIG. 2) so that the webbing 30 is pulled out from the spool 20. A state where the webbing 30 is maximally wound on the spool 20 is referred to as a maximal wound (taken up) state (full housed state). Meanwhile, a state where the webbing 30 is maximally pulled out from the spool 20 is referred to as a maximal pulled out state.

Furthermore, a spiral spring (not shown in the drawings) is provided at the outside of the leg plate 18 of the frame 12, and the outer side end of the spiral spring in the spiral direction is connected to the leg plate 18 (the frame 12). Further, the inner side end of the spiral spring in the spiral direction is fixed to the end of the spool 20 at the leg plate 18 side, and the spool 20 is biased in the take-up direction by the spiral spring.

[Lock Mechanism 32]

The lock mechanism 32 includes the lock plate 34 and the sensor mechanism 38. The lock plate 34 is substantially formed in a triangular plate shape, and is movably disposed inside the movement groove 28 of the lock base 22, the lock plate 34 is set such that the plate thickness direction is as the axial direction of the spool 20. A circular cylinder (columnar) guide protrusion 36 is integrally formed with the lock plate 34, and the guide protrusion 36 protrudes from the lock plate 34 toward the opposite side to the spool 20. Further, at one end of the lock plate 34, ratchet teeth 34A (plural (two in the embodiment)) are formed. By that the lock plate 34 moves, inside the movement groove 28, toward the outside in the radial direction of the lock base 22, the ratchet teeth 34A engage with the ratchet teeth 16B of the above-described frame 12.

The sensor mechanism 38 includes a sensor holder 40, a V-gear 48 as a "gear", the return spring 54, and a W-pawl 56, and is disposed at the outside of the leg plate 16 of the frame 12.

The sensor holder 40 is formed in a concave shape opened to the leg plate 16 side, and is fixed to the leg plate 16. Further, a holder side support hole 42 is formed at substantially center portion of a bottom wall 40A of the sensor holder 40 so as to be coaxial with the spool 20. The rotation shaft 24 of the spool 20 is inserted into the holder side support hole 42 via a bush 70 to be described later, so that the spool 20 is rotatably supported by the sensor holder 40.

In addition, a pawl shaft portion (shaft portion for pawl) 44 which is for supporting an ALR pawl 104 to be described later is integrally formed with the bottom wall 40A of the sensor holder 40, and the pawl shaft portion 44 is formed in substantially circular cylinder (columnar) shape so as to protrude from the sensor holder 40 toward the opposite side to the frame 12. Further, at the lower portion of the sensor holder 40, a sensor accommodating unit 46 which accommodates an acceleration sensor 58 to be described later, is formed, and the sensor accommodating unit 46 is formed in a concave shape which is opened toward the opposite side to the frame 12.

The V-gear 48 is substantially formed in a disk shape, and is accommodated inside the sensor holder 40. At the shaft center portion of the V-gear 48, a penetration hole 50 is formed, and the rotation shaft 24 of the spool 20 is inserted into the penetration hole 50. Accordingly, the V-gear 48 is rotatably supported by the rotation shaft 24. Further, plural lock teeth 48A are formed on the outer peripheral portion of the V-gear 48. In addition, at the V-gear 48, a pawl accommodating unit 52 which is for accommodating the W-pawl 56 to be described later is formed, and the pawl accommodating unit 52 is formed in a concave shape which is opened toward the sensor holder 40 side.

The return spring 54 is configured as a compression coil spring. The return spring 54 is disposed between the V-gear 48 and the lock base 22, where one end is caught by the convex catching portion 26 of the lock base 22 and the other end is caught by the V-gear 48. The V-gear 48 is biased in the pull-out direction (the direction indicated by the arrow C of FIG. 2) by the return spring 54 with respect to the lock base 22, and hence the V-gear 48 rotates so as to be integral with the spool 20 in a normal state.

The W-pawl 56 is substantially formed in a C-shape, and is accommodated inside the pawl accommodating unit 52 of the V-gear 48. The W-pawl 56 is axially supported by the V-gear 48 in a swingable manner by the axial direction of the W-pawl 56 being as the axial direction of the spool 20. Further, at one end portion of the W-pawl 56, pawl engagement teeth 56A are formed. When the W-pawl 56 rotates relative to the V-gear 48 due to inertia acting on the W-pawl 56 in a case where the spool 20 abruptly rotates in the pull-out direction by abruptly the webbing 30 being pulled out, the pawl engagement teeth 56A engage with holder side ratchet teeth (not shown in the drawings) formed on the sensor holder 40, so that the rotation of the V-gear 48 in the pull-out direction is regulated.

Further, the sensor mechanism 38 includes an acceleration sensor 58 which is well known, and the acceleration sensor is disposed inside the sensor accommodating unit 46 of the sensor holder 40. The acceleration sensor 58 includes a sensor housing 60, a spherical ball 62 which is disposed on the sensor housing 60, and a sensor lever 64 which abuts the ball 62 and is provided so as to be able to swing in the sensor housing 60 through a shaft 61. For example, when the vehicle is in abruptly decelerated state and the ball 62 rolls on the sensor housing 60, the sensor lever 64 swings and the lever engagement teeth 64A of the sensor lever 64 engage with the lock teeth 48A of the V-gear 48. Accordingly, even in this case, the rotation of the V-gear 48 in the pull-out direction is regulated.

Here, when the rotation of the V-gear 48 in the pull-out direction is regulated in a state in which the spool 20 and the V-gear 48 rotate in the pull-out direction, the lock base 22 (spool 20) is rotated relative to the V-gear 48 in the pull-out direction against the biasing force of the return spring 54. That is, the V-gear 48 rotates relative to the lock base 22 (spool 20) in the take-up direction. At this time, the guide protrusion 36 of the lock plate 34 moves at the inside of a guide groove (not shown in the drawings) of the V-gear 48, and the lock plate 34 moves toward the outside in the radial direction of the lock base 22. Accordingly, the ratchet teeth 34A of the lock plate 34 engage with the ratchet teeth 16B of the frame 12, so that the rotation of the spool 20 in the pull-out direction is regulated (prohibited).

[ALR Mechanism 66]

The ALR mechanism 66 includes a speed reduction mechanism 68, an ALR cam 82 as a "switching cam", a control disk 96, the ALR pawl 104, and a cover 112. Further, the speed reduction mechanism 68 includes the bush 70 and an ALR gear 76.

Figure 1:
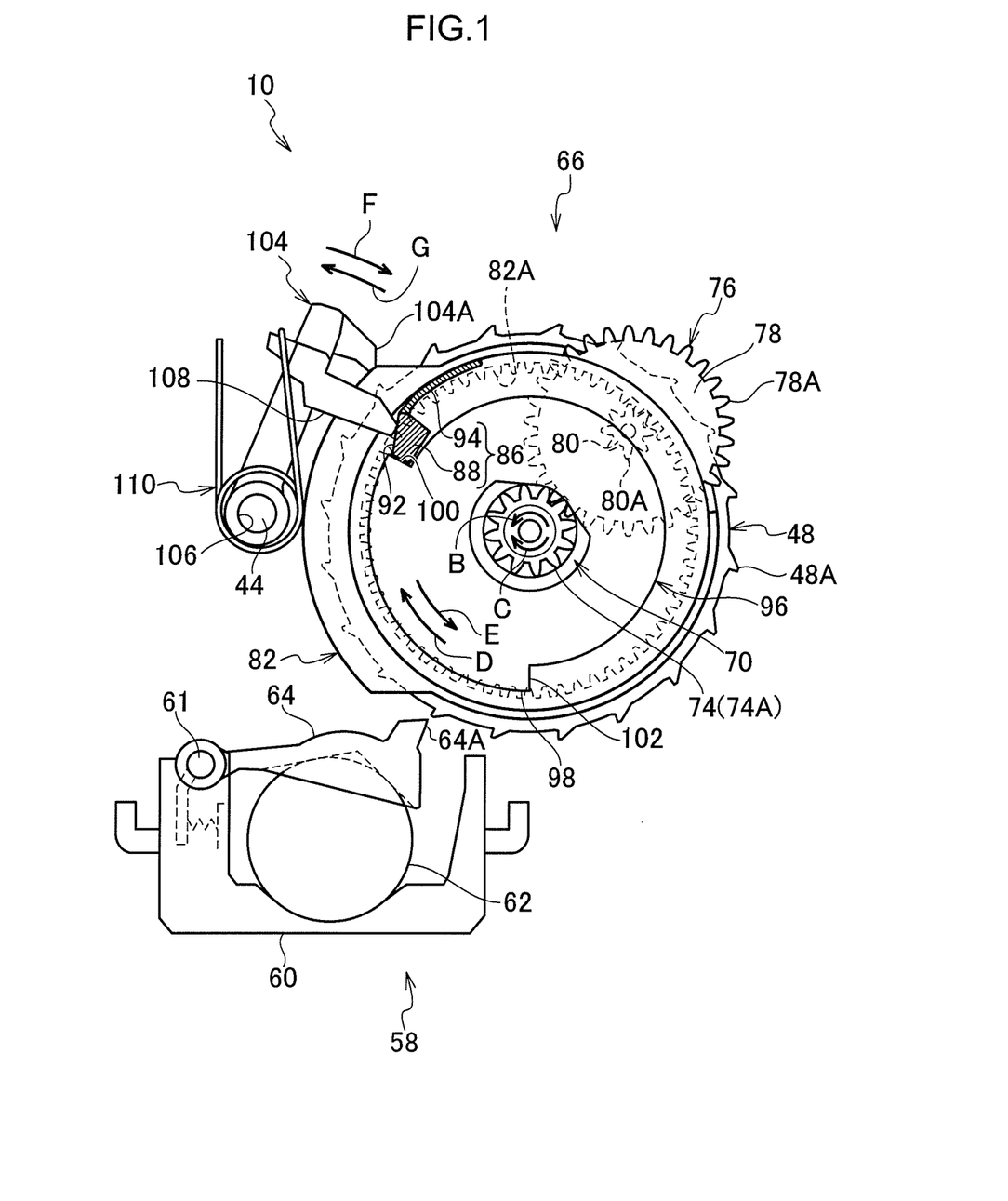
FIG. 1 is a side view illustrating a maximal pulled out state of an ALR mechanism that is used in a webbing take-up device according to the embodiment.

The bush 70 is substantially formed in a cylindrical shape, and the rotation shaft 24 of the spool 20 is fitted into the bush 70. Accordingly, the bush 70 rotates so as to be integral with the spool 20. A support portion 72 is formed at the middle portion of the bush 70 in the axial direction, the bush 70 is disposed inside the holder side support hole 42 of the sensor holder 40, and the support portion 72 is rotatably supported by the holder side support hole 42. Further, as illustrated in FIG. 1, a bush gear portion 74 is formed at the bush 70 at the opposite to the frame 12, and, at the entire outer periphery of the bush gear portion 74, plural outer teeth 74A (see FIG. 1) are formed. In FIG. 2, the bush gear portion 74 is simply illustrated.

The ALR gear 76 is substantially formed in a circular disk shape, and is rotatably supported by the sensor holder 40 at the outside of the bush 70 in the radial direction by the axial direction of the ALR gear 76 being as the axial direction of the spool 20. A large diameter gear portion 78 is formed in the ALR gear 76 at the frame 12 side. At the entire outer periphery of the large diameter gear portion 78, plural outer teeth 78A (see FIG. 1) are formed, and the outer teeth 78A engage with the outer teeth 74A of the bush 70. In FIG. 2, the large diameter gear portion 78 is simply illustrated.

Further, a small diameter gear portion 80 is formed in the ALR gear 76 at the side opposite to the frame 12, and the small diameter gear portion 80 is disposed so as to be coaxial with the large diameter gear portion 78. At the entire outer periphery of the small diameter gear portion 80, plural outer teeth 80A (see FIG. 1) are formed, and the outer teeth 80A engage with inner teeth 82A of the ALR cam 82 to be described later. In FIG. 2, the small diameter gear portion 80 is simply illustrated.

The ALR cam 82 is disposed at the side of the sensor holder 40 which side is opposite to the frame 12 side, and is substantially formed in a shallow bottomed cylindrical shape which is opened toward the sensor holder 40 side. Further, the ALR cam 82 is disposed so as to be coaxial with the spool 20, and a circular cam support hole 84 which is formed in the bottom wall of the ALR cam 82 is rotatably supported by the sensor holder 40.

At the entire inner periphery of the ALR cam 82, plural inner teeth 82A (see FIG. 1) are formed, and the inner teeth 82A engage with the outer teeth 80A of the small diameter gear portion 80 in the ALR gear 76. Accordingly, when the spool 20 rotates, the rotation of the ALR cam 82 is reduced by the bush 70 and the ALR gear 76, and the ALR cam 82 rotates in a direction opposite to the rotation direction of the spool 20.

Figure 6:
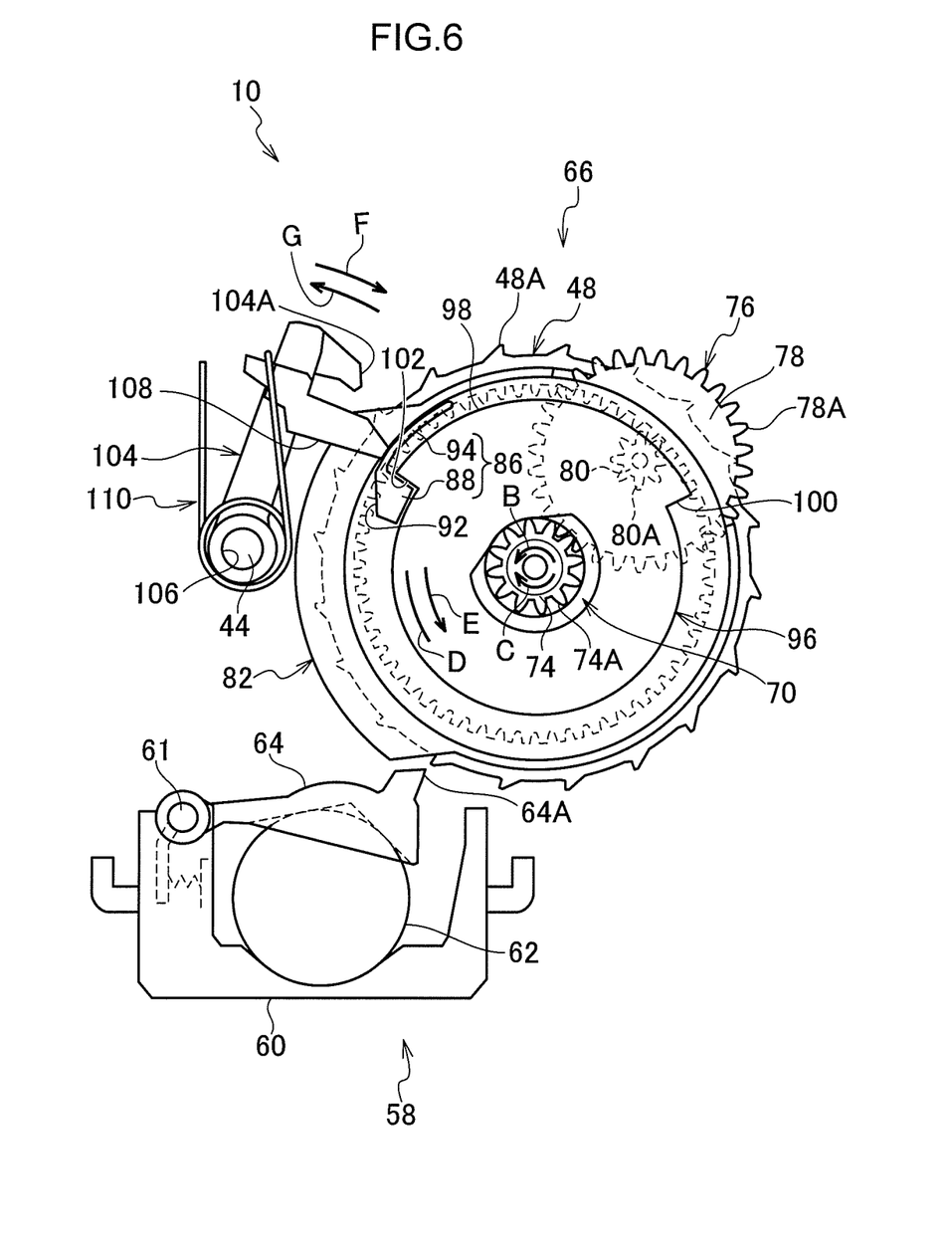
FIG. 6 is a side view illustrating a state where the switching cam illustrated in FIG. 5 further rotates in the take-up direction so that the ALR mechanism becomes a maximal taken up state.

In addition, when the spool 20 rotates in the pull-out direction from the maximal wound (taken-up) state illustrated in FIG. 6 so as to be pulled to the maximal pulled out state illustrated in FIG. 1, the ALR cam 82 rotates by substantially one revolution.

As illustrated in FIG. 1, an interlocking portion 86 is integrally formed at the bottom wall of the ALR cam 82 at a surface which is at the opposite side to the sensor holder 40, and the interlocking portion 86 includes a pressing (pushing) portion 88 (see an area surrounded by slanted lines of FIG. 1) and an extension rib 94 (see an area surrounded by the other slanted lines of FIG. 1) as an "extension portion".

The pressing portion 88 is substantially formed in a trapezoid shape when viewed from one side of the spool 20 in the axial direction (the direction indicated by the arrow A of FIG. 1), and protrudes from the ALR cam 82 toward the opposite side to the sensor holder 40. The outer side portion, in the radial direction of the ALR cam 82, of the pressing portion 88 is formed as a sloped surface 92 as a "sloped portion", and the sloped surface 92 is disposed so as to be inclined toward the outside in the radial direction of the ALR cam 82 as it goes toward the take-up direction (the direction indicated by the arrow D of FIG. 1) of the ALR cam 82 when viewed from one side in the axial direction of the spool 20.

The extension rib 94 extends further in the take-up direction (the direction indicated by the arrow D of FIG. 1) of the ALR cam 82 from the outer side portion, in the radial direction of the ALR cam 82, of the pressing portion 88. The sloped surface 92 is connected to an outer side surface, in the radial direction of the ALR cam 82, of the extension rib 94.

As illustrated in FIG. 2, the control disk 96 is substantially formed in an annular disk shape, and is disposed at the side of the ALR cam 82 which side is opposite to the sensor holder 40 and so as to be coaxial with the spool 20. The control disk 96 is rotatably supported by the sensor holder 40, and is rotatable relative to the ALR cam 82.

As illustrated in FIG. 1, a holding flange 98 as a "holding portion" is integrally formed at a part of the outer peripheral portion of the control disk 96, and the holding flange 98 protrudes toward the outside in the radial direction of the control disk 96 and is curved along the circumferential direction of the control disk 96.

Further, an end of the holding flange 98 at one side in the circumferential direction of the control disk 96 (the direction indicated by the arrow D of FIG. 1) is formed as a pulled out side end 100, and an end of the holding flange 98 at the other side in the circumferential direction of the control disk 96 (the direction indicated by the arrow E of FIG. 1) is formed as a take-up side end 102. When the ALR cam 82 rotates in the pull-out direction or the take-up direction, the pressing portion 88 of the ALR cam 82 abuts the pulled out side end 100 or the take-up side end 102 of the control disk 96. Accordingly, by that the pressing portion 88 presses (pushes) the pulled side end 100 or the take-up side end 102, the control disk 96 rotates interlockingly with the rotation of the ALR cam 82.

Further, the outer side surface of the holding flange 98 in the radial direction of the control disk 96 is disposed so that no step is substantially formed between the pull-out direction side end of the sloped surface 92 and the outer side surface of the holding flange 98. Accordingly, the extension rib 94 is disposed at the outer side in the radial direction of the ALR cam 82 than the holding flange 98.

As illustrated in FIGS. 1 and 2, the ALR pawl 104 is substantially formed in an F-shape when viewed from one side in the axial direction of the spool 20, and is disposed at the outside in the radial direction of the V-gear 48. At the lower end of the ALR pawl 104, a pawl side support hole 106 is formed to penetrate in the axial direction of the spool 20, and the pawl shaft portion 44 of the sensor holder 40 is inserted into the pawl side support hole 106. Accordingly, the ALR pawl 104 is rotatably supported by the sensor holder 40.

Further, an ALR spring 110 which is formed as a torsion spring is attached (assembled) to the lower end of the ALR pawl 104. One end of the ALR spring 110 is caught by the ALR pawl 104, the other end of the ALR spring 110 is caught by the sensor holder 40, and the ALR pawl 104 is biased toward the ALR cam 82 (V-gear 48) side (in the direction indicated by the arrow F of FIG. 1 and the like).

Figure 3:
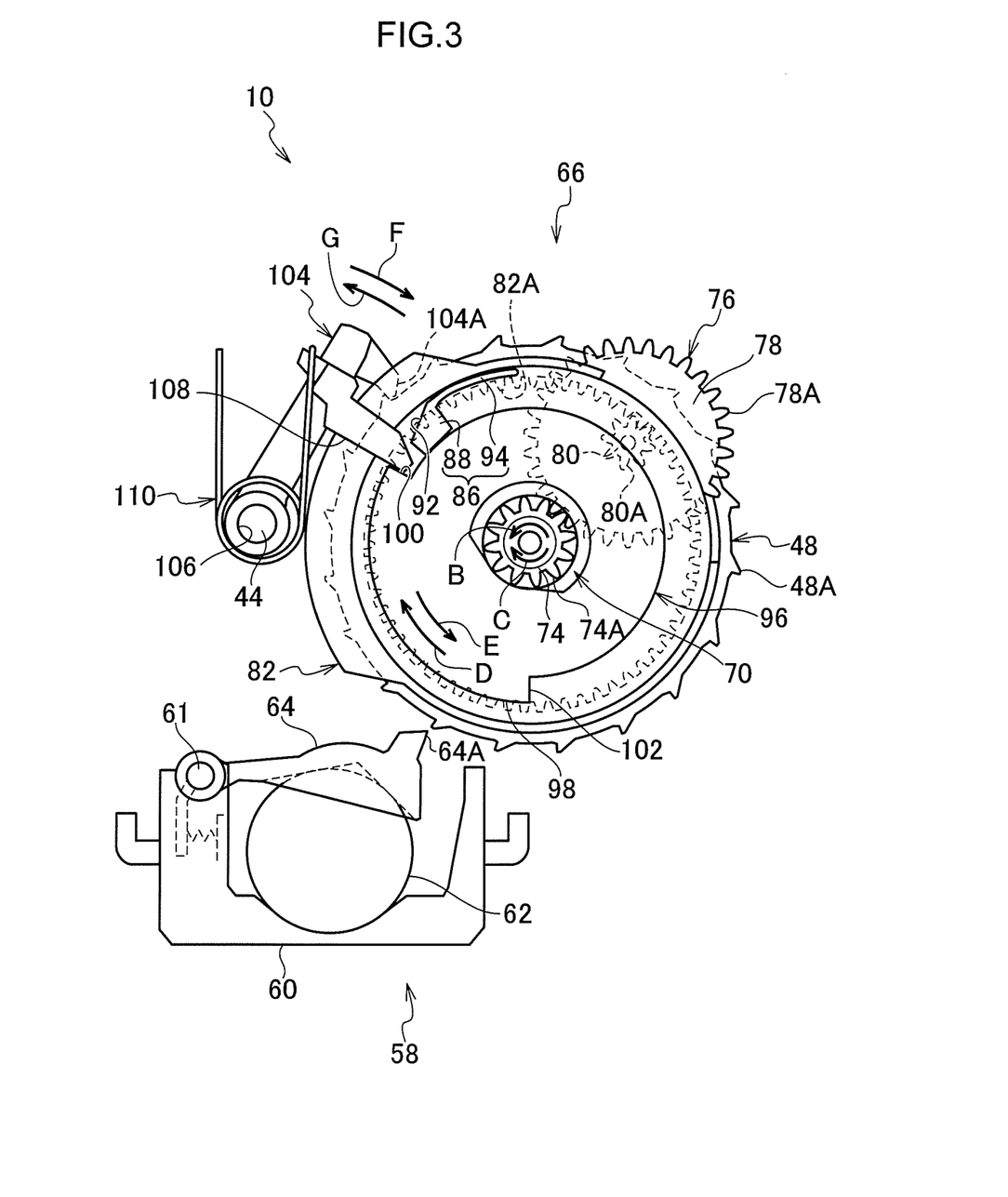
FIG. 3 is a side view illustrating a state where the switching cam used in the ALR mechanism illustrated in FIG. 1 rotates in the take-up direction so that an ALR pawl moves to a lock position.

In addition, ALR engagement teeth 104A are integrally formed at the upper end of the ALR pawl 104, and the ALR engagement teeth 104A protrude from the ALR pawl 104 toward the V-gear 48 side. When the ALR pawl 104 is rotated and moved toward the V-gear 48 side so the ALR engagement teeth 104A engage with the lock teeth 48A of the V-gear 48, the rotation of the V-gear 48 in the pull-out direction (the direction indicated by the arrow C of FIG. 1 and the like) is regulated (this position is illustrated in FIG. 3 and the position is referred to a "lock position").

Figure 5:
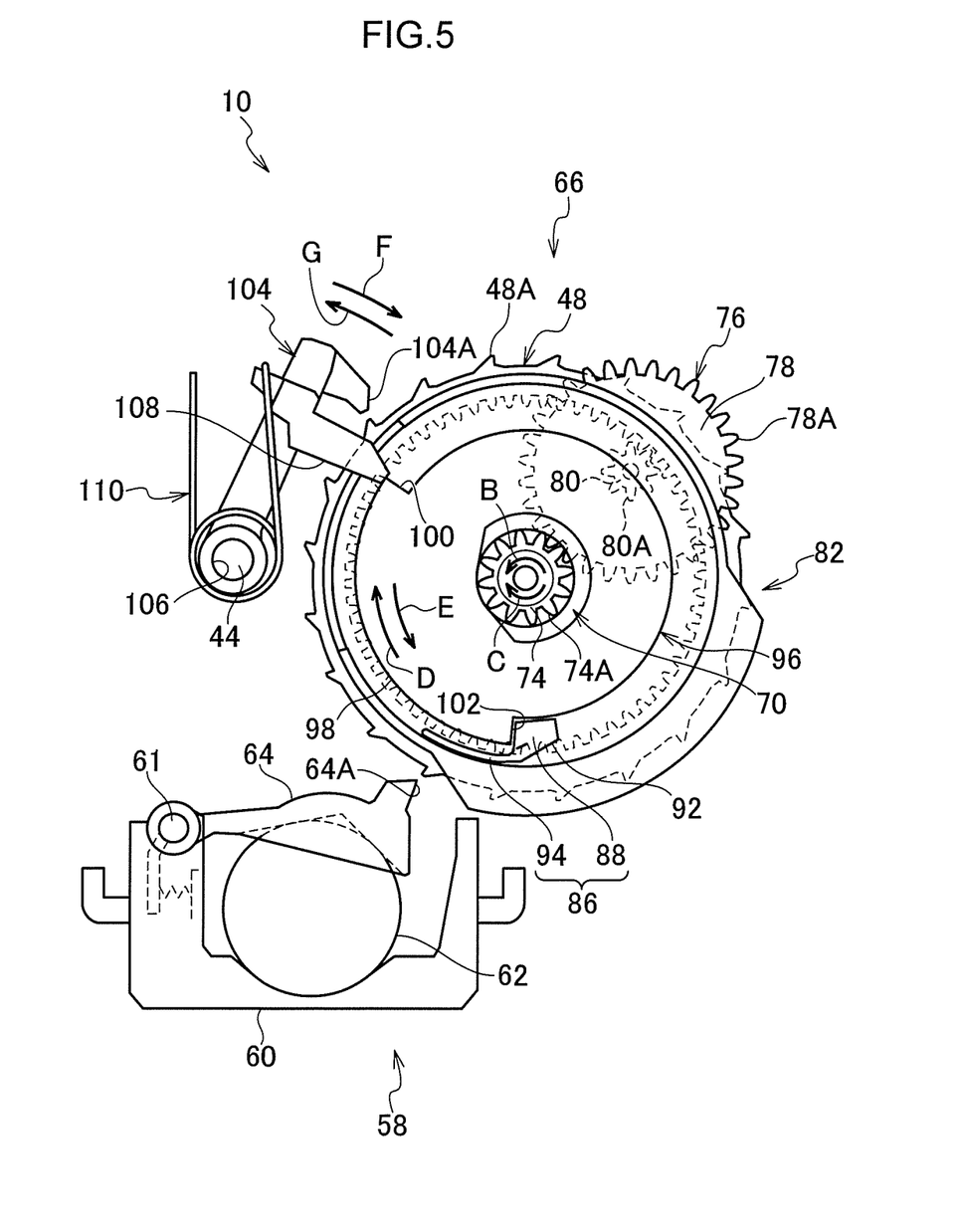
FIG. 5 is a side view illustrating a state where the switching cam illustrated in FIG. 4 further rotates in the take-up direction so that the ALR pawl moves from the lock position to a first release position.

Further, an abut piece 108 as a "abut portion" is integrally formed at the middle portion of the ALR pawl 104 in the length direction, and the abut piece 108 protrudes from the ALR pawl 104 toward the ALR cam 82 (the control disk 96) side. The leading end of the abut piece 108 is configured so as to be able to abut the holding flange 98 of the control disk 96 and the interlocking portion 86 of the ALR cam 82. Accordingly, by that the leading end of the abut piece 108 abuts with the holding flange 98, the ALR engagement teeth 104A is separated (moved) away from the lock teeth 48A of the V-gear 48 so that the rotation of the V-gear 48 in the pull-out direction is permitted (this position is illustrated in FIG. 5, and the position is referred to as a "first release position" as a "release position"). Further, by that the leading end of the abut piece 108 abuts with the extension rib 94 of the interlocking portion 86, the ALR engagement teeth 104A further separated (moved) away from the lock teeth 48A of the V-gear 48 (this position is illustrated in FIG. 6 and the position is referred to as a "second release position" as the "release position").

As illustrated in FIG. 2, the cover 112 is disposed at the side of the sensor holder 40 which side is opposite to the frame 12, and is formed in a concave shape which is opened toward the frame 12 side. The cover 112 is fixed to the frame 12 in a state of covering the ALR mechanism 66 and the sensor holder 40.

Next, the operation and the effect of the embodiment will be described.

In the webbing take-up device 10 with the above-described configuration, the pressing portion 88 of the interlocking portion 86 of the ALR cam 82 abuts with the take-up side end 102 of the holding flange 98 of the control disk 96 in the maximal taken up state (full retracted state) in which the webbing 30 is retracted to the webbing take-up device 10 as illustrated in FIG. 6. Further, in this state, the extension rib 94 of the ALR cam 82 is disposed at the outside in the radial direction of the holding flange 98 of the control disk 96, and the abut piece 108 of the ALR pawl 104 abuts with the extension rib 94. That is, in the maximal taken up state (the full retracted state), the ALR pawl 104 is arranged at the second release position, and the ALR engagement teeth 104A of the ALR pawl 104 is separated away from the lock teeth 48A of the V-gear 48.

When the webbing 30 is pulled from this state, the spool 20 rotates in the pull-out direction thereof (the direction indicated by the arrow C of FIG. 1 and the like) and the ALR cam 82 rotates in the pull-out direction thereof (the direction indicated by the arrow E of FIG. 1). Accordingly, the ALR cam 82 rotates relative to the control disk 96 in the pull-out direction, and the pressing portion 88 of the ALR cam 82 is separated (moved) away from the holding flange 98 of the control disk 96.

At this time, the extension rib 94 of the ALR cam 82 rotates relative to the abut piece 108 of the ALR pawl 104 in the pull-out direction of the ALR cam 82, and the abut piece 108 is transferred from the extension rib 94 to the holding flange 98 of the control disk 96. That is, the ALR pawl 104 rotates from the second release position to the first release position. Furthermore, since the ALR pawl 104 is arranged at the first release position in this state, a state in which the ALR engagement teeth 104A of the ALR pawl 104 is separated away from the lock teeth 48A of the V-gear 48 is maintained.

Then, by the webbing 30 being applied to the body of the occupant in the state in which the ALR pawl 104 is held at the first release position, the webbing take-up device 10 is in made to be in the ELR (Emergency Locking Retractor) state.

That is, for example, when the vehicle is abruptly decelerated and the ball 62 of the acceleration sensor 58 rolls on the sensor housing 60, the sensor lever 64 swings. Accordingly, the sensor lever 64 engages with the lock teeth 48A of the V-gear 48, so that the rotation of the V-gear 48 in the pull-out direction is regulated.

Further, for example, when the W-pawl 56 rotates relative to the V-gear 48 by the inertia force acting on the W-pawl 56 in a case where the spool 20 abruptly is rotated in the pull-out direction by the webbing 30 being abruptly pulled at the time of the abrupt vehicle decelerating, the pawl engagement teeth 56A engage with the holder side ratchet teeth formed on the sensor holder 40. Accordingly, the rotation of the V-gear 48 in the pull-out direction is regulated.

When the lock base 22 (the spool 20) rotates relative to the V-gear 48 in the pull-out direction against the biasing force of the return spring 54 in a state in which the rotation of the V-gear 48 in the pull-out direction is regulated, the guide protrusion 36 of the lock plate 34 moves inside the guide groove of the V-gear 48, and the lock plate 34 moves toward the outside in the radial direction of the lock base 22. Accordingly, the ratchet teeth 34A of the lock plate 34 engage with the ratchet teeth 16B of the frame 12. Thus, the rotation of the spool 20 in the pull-out direction is stopped (inhibited), so that the body of the occupant is restrained by the webbing 30.

Meanwhile, when the webbing 30 is made to be in the maximal pulled out state, due to the ALR cam 82 being rotated in the pull-out direction (the direction indicated by the arrow E of FIG. 1 and the like), the pressing portion 88 of the ALR cam 82 presses (pushes) the pulled side end 100 of the holding flange 98 of the control disk 96, and the control disk 96 is rotated to the position of the maximal pulled out state together with the ALR cam 82 (see FIG. 1). At this time, the abut piece 108 of the ALR pawl 104 is transferred from the holding flange 98 of the control disk 96 to the sloped surface 92 of the ALR cam 82. That is, the ALR pawl 104 is rotated from the first release position to the second release position side (the direction indicated by the arrow G of FIG. 1 and the like). Accordingly, the ALR engagement teeth 104A of the ALR pawl 104 further separate (move) away from the lock teeth 48A of the V-gear 48.

When the spool 20 is rotated in the take-up direction (the direction indicated by the arrow B of FIG. 1 and the like) from this state, the bush 70 is rotated in the take-up direction (the direction indicated by the arrow B of FIG. 1 and the like) and the ALR cam 82 is rotated in the take-up direction (the direction indicated by the arrow D of FIG. 1 and the like). Accordingly, the pressing portion 88 of the ALR cam 82 starts to move away from the holding flange 98 of the control disk 96, and the leading end of the abut piece 108 of the ALR pawl 104 rotates toward the lock position (in the direction indicated by the arrow F of FIG. 1 and the like) while contact-sliding on the sloped surface 92.

When the ALR cam 82 is rotated by a predetermined distance, the holding of the ALR pawl 104 by the sloped surface 92 of the ALR cam 82 is released (ended), so the ALR pawl 104 is rotated to the lock position by the biasing force of the ALR spring 110 (see FIG. 3). Accordingly, the ALR engagement teeth 104A of the ALR pawl 104 engage with the lock teeth 48A of the V-gear 48, so the rotation of the V-gear 48 in the pull-out direction is regulated.

Accordingly, as described above, when the spool 20 is rotated relative to the V-gear 48 in the pull-out direction in this state, the lock plate 34 moves toward the outside in the radial direction of the lock base 22 and the ratchet teeth 34A of the lock plate 34 engage with the ratchet teeth 16B of the frame 12. Accordingly, the rotation of the spool 20 in the pull-out direction is stopped (inhibited). That is, the webbing take-up device 10 is switched from the ELR state to the ALR (Automatic Locking Retractor) state.

Figure 4:
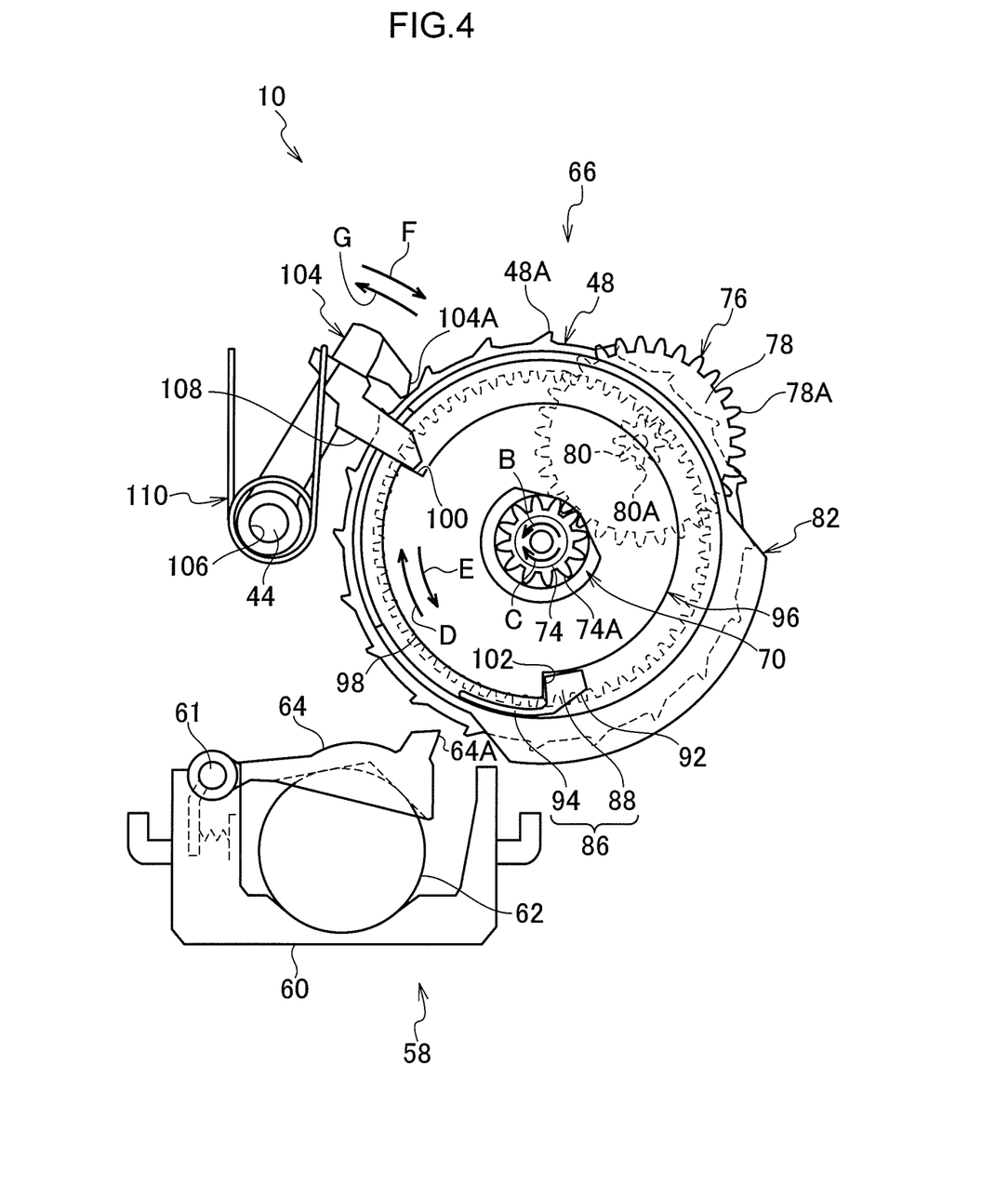
FIG. 4 is a side view illustrating a state where the switching cam illustrated in FIG. 3 further rotates in the take-up direction so that a pressing portion of the switching cam abuts with a holding flange of a control disk.

When the spool 20 further rotates in the take-up direction (the direction indicated by the arrow B of FIG. 1 and the like) from this state, the pressing portion 88 of the ALR cam 82 abuts with the take-up side end 102 of the holding flange 98 of the control disk 96 as illustrated in FIG. 4. Furthermore, in this state, the extension rib 94 of the ALR cam 82 is arranged at the outside in the radial direction of the ALR cam 82 with respect to the holding flange 98, so the extension rib 94 does not interfere with the holding flange 98.

When the spool 20 further rotates in the take-up direction (the direction indicated by the arrow B of FIG. 1 and the like), the take-up side end 102 of the holding flange 98 of the control disk 96 is pressed (pushed) by the pressing portion 88 of the ALR cam 82, and the control disk 96 is rotated in the take-up direction (the direction indicated by the arrow D of FIG. 1 and the like) interlockingly with the rotation of the ALR cam 82 in the take-up direction (the direction indicated by the arrow D of FIG. 1 and the like). Accordingly, the abut piece 108 of the ALR pawl 104 is pressed (pushed) by the pulled side end 100 of the holding flange 98, so the ALR pawl 104 is rotated toward the first release position side (the direction indicated by the arrow G of FIG. 1 and the like). Thus, the leading end of the abut piece 108 abuts with the holding flange 98, and the ALR engagement teeth 104A of the ALR pawl 104 move away from the lock teeth 48A of the V-gear 48 (see FIG. 5). Accordingly, the webbing take-up device 10 is switched from the ALR state to the ELR state.

When the spool 20 further rotates in the take-up direction (the direction indicated by the arrow B of FIG. 1 and the like) from this state, the control disk 96 is rotated in the take-up direction (the direction indicated by the arrow D of FIG. 1 and the like) interlockingly with the rotation of the ALR cam 82 in the take-up direction. Then, when the spool 20 rotates to the position of the maximal taken up state, the abut piece 108 of the ALR pawl 104 is transferred from the holding flange 98 of the control disk 96 to the extension rib 94 of the interlocking portion 86 of the ALR cam 82. That is, the ALR pawl 104 is rotated from the first release position to the second release position (see FIG. 6).

Here, the extension rib 94 extends from the pressing portion 88 in the take-up direction of the ALR cam 82, and is able to abut with the ALR pawl 104. Accordingly, even in a case in which the ALR cam 82 excessively rotates in the pull-out direction with respect to a set position for the maximal pulled out state, the ALR pawl 104 abuts with the extension rib 94. Accordingly, it is possible to suppress a state in which the ALR pawl 104 engages with the V-gear 48 while climbing over the pressing portion 88. For this reason, even if a rotation variation of the ALR cam 82 becomes large by setting the speed reduction ratio of the speed reduction mechanism 68 to a small value, such rotation variation can be absorbed by the extension rib 94. Thus, it is possible to absorb the rotation variation of the ALR cam 82 while improving the accuracy of the switching timing from the ELR (or ALR) to the ALR (or ELR) state.

Further, the extension rib 94 is disposed at the outside in the radial direction of the ALR cam 82 with respect to the holding flange 98. Accordingly, even in a case in which the ALR pawl 104 abuts with the extension rib 94 in the maximal pulled out state, the ALR pawl 104 is moved (rotated) from the first release position to the second release position, and hence the escape amount of the ALR pawl 104 with respect to the V-gear 48 at the release position can be made large.

Further, when the ALR cam 82 is rotated in the take-up direction and the pressing portion 88 presses (abuts with) the holding flange 98, the extension rib 94 is disposed at the outside in the radial direction with respect to the holding flange 98, so that the interference between the extension rib 94 and the holding flange 98 can be suppressed.

In addition, the sloped surface 92 is formed at the outer side portion of the pressing portion 88 in the radial direction of the ALR cam 82. The sloped surface 92 is arranged so as to be inclined (sloped) toward the outside in the radial direction of the ALR cam 82 as it goes in the take-up direction of the ALR cam 82. Accordingly, even in a case in which the ALR pawl 104 abuts against the extension rib 94 in the maximal pulled out state, the ALR pawl 104 can smoothly contact-slide from the sloped surface 92 to the extension rib 94.

Figure 7:
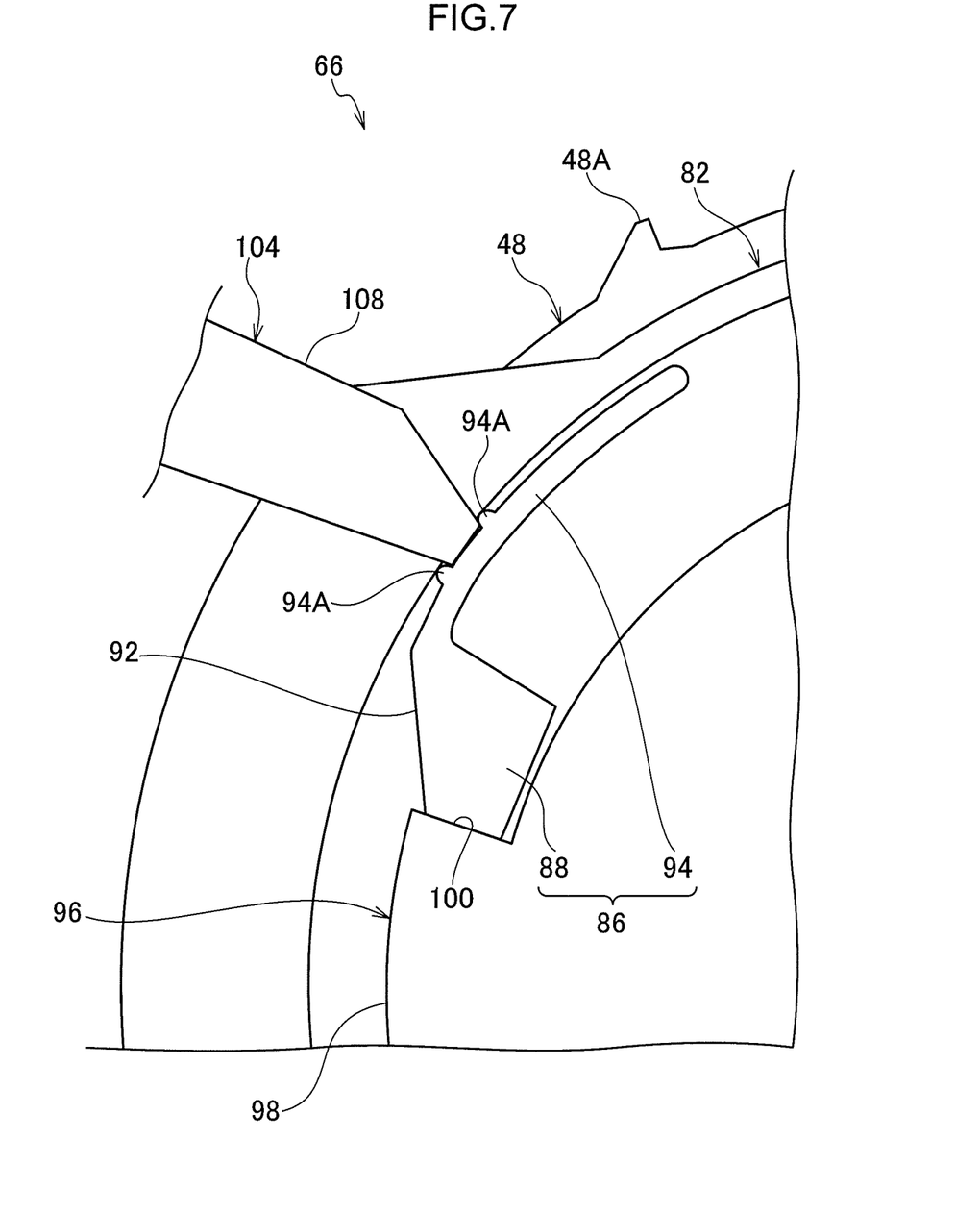
FIG. 7 is an enlarged side view illustrating an extension rib of the switching cam used in the webbing take-up device according to the embodiment.

Furthermore, in the embodiment, the abut piece 108 of the ALR pawl 104 is set so as to abut with the sloped surface 92 of the ALR cam 82 in the maximal pulled out state. Instead of this, the abut piece 108 may be set so as to abut with the extension rib 94 of the ALR cam 82 in the maximal pulled out state. In this case, as illustrated in FIG. 7, a pair of convex portions 94A as a "positioning portion" may be formed in the extension rib 94, in which the abut piece 108 is arranged. Due thereto, by the abut piece 108 being disposed between the pair of convex portions 94A in the maximal pulled out state and the ALR pawl 104 being assembled, it is possible to suppress the occurrence of the extra length of the webbing 30 in the maximal pulled out state.

Further, in the embodiment, it is configured that the ALR cam 82 rotates with substantially one revolution by the speed reduction mechanism 68 from the maximal taken up state to the maximal pulled out state. Instead of this, the ALR cam 82 may rotate with substantially one revolution or more by the speed reduction mechanism 68 from the maximal taken up state to the maximal pulled out state. Further, the extension length of the extension rib 94 may be arbitrarily set correspondingly to this configuration. Accordingly, it is possible to further improve the switching timing from the ELR (or ALR) state to the ALR (or ELR) state.

What is claimed is:

1. A webbing take-up device comprising:
    a spool that rotates in a take-up direction so as to take up a webbing thereon and rotates in a pull-out direction by the webbing being pulled out therefrom;
    a lock mechanism that stops rotation of the spool in the pull-out direction by the lock mechanism being operated;
    an ALR pawl that is movable between a lock position where the ALR pawl and the lock mechanism are engaged so that the lock mechanism is operated, and a release position where engagement of the ALR pawl and the lock mechanism is released;
    a switching cam that is connected to the spool via a speed reduction mechanism which reduces rotation of the spool, and rotates interlockingly with rotation of the spool;
    a control disk that is provided so as to be coaxial with the switching cam and that includes a holding portion, the holding portion being pressed by the switching cam so as to rotate interlockingly with the switching cam, and the holding portion abutting with the ALR pawl so as to hold the ALR pawl at the release position between from a maximal taken-up state where the webbing is maximally taken up on the spool to a state which is near a maximal pulled out state where the webbing is maximally pulled out from the spool;
    a pressing portion that is integrally formed with the switching cam,
        the pressing portion pressing the holding portion so as to rotate the control disk when the switching cam is rotated in the pull-out direction,
        the pressing portion abutting with the ALR pawl in the maximal pulled out state so as to hold the ALR pawl at the release position, and
        the pressing portion permitting movement of the ALR pawl to the lock position by the switching cam being rotated in the take-up direction from the maximal pulled out state such that the pressing portion is separated away from the holding portion by a predetermined distance; and
    an extension portion that extends from the pressing portion in the take-up direction of the switching cam and that is configured to be able to abut with the ALR pawl to maintain the ALR pawl in the release position in the event that the ALR pawl climbs over the pressing portion as a result of rotational over-travel of the switching cam in the pull-out direction of the switching cam.

2. The webbing take-up device of claim 1, wherein:
    the lock mechanism includes a gear, the gear being disposed so as to be coaxial with the switching cam and the gear including lock teeth formed on an outer peripheral portion of the gear so as to be able to engage with the ALR pawl;
    the ALR pawl is configured to be rotatable at an outer side in a radial direction of the gear; and
    the extension portion is disposed at an outer side in a radial direction of the switching cam with respect to the holding portion.

3. The webbing take-up device of claim 2, wherein a sloped portion is formed at the pressing portion at an outer side portion in the radial direction of the switching cam, the sloped portion being sloped toward the outer side in the radial direction of the switching cam on progress in the take-up direction of the switching cam.

4. The webbing take-up device of claim 3, wherein: the ALR pawl includes an abut portion that is configured to be able to abut with the pressing portion and the holding portion; and a positioning portion, at which the abut portion is arranged in the maximal pulled out state, is formed at the extension portion.

5. The webbing take-up device of claim 2, wherein: the ALR pawl includes an abut portion that is configured to be able to abut with the pressing portion and the holding portion; and a positioning portion, at which the abut portion is arranged in the maximal pulled out state, is formed at the extension portion.

6. The webbing take-up device of claim 1, wherein: the ALR pawl includes an abut portion that is configured to be able to abut with the pressing portion and the holding portion; and a positioning portion, at which the abut portion is arranged in the maximal pulled out state, is formed at the extension portion.

7. The webbing take-up device of claim 1, wherein the extension portion extends in the take up direction of the switching cam from an outside portion, in a radial direction of the switching cam, of the pressing portion, and a surface of the outside portion of the pressing portion is connected to an outer side surface, in the radial direction, of the extension portion.

* * * * *